(12) United States Patent
Cummings

(10) Patent No.: US 12,116,984 B2
(45) Date of Patent: Oct. 15, 2024

(54) CONTINUOUS FLUID FLOW POWER GENERATOR

(71) Applicant: Michael Scot Cummings, Walterboro, SC (US)

(72) Inventor: Michael Scot Cummings, Walterboro, SC (US)

( * ) Notice: Subject to any disclaimer, the term of this patent is extended or adjusted under 35 U.S.C. 154(b) by 0 days.

(21) Appl. No.: 18/439,477

(22) Filed: Feb. 12, 2024

(65) Prior Publication Data

US 2024/0247640 A1 Jul. 25, 2024

Related U.S. Application Data

(62) Division of application No. 17/602,912, filed as application No. PCT/US2019/028509 on Apr. 22, 2019, now Pat. No. 12,006,918.

(51) Int. Cl.
| | | |
|---|---|---|
| *F03D 9/00* | (2016.01) | |
| *F03B 13/22* | (2006.01) | |
| *F03D 9/11* | (2016.01) | |

(52) U.S. Cl.
CPC .............. *F03D 9/008* (2013.01); *F03B 13/22* (2013.01); *F03D 9/007* (2013.01); *F03D 9/11* (2016.05);
(Continued)

(58) Field of Classification Search
CPC .. F03B 3/12; F03B 3/121; F03B 3/123; F03B 3/13; F03B 3/145; F03B 13/10;
(Continued)

(56) References Cited

U.S. PATENT DOCUMENTS 4,095,422 A * 6/1978 Kurakake ............. F03B 17/065
416/85
4,346,305 A 8/1982 White
(Continued)

FOREIGN PATENT DOCUMENTS

CN 107044378 A 8/2017
CN 110435827 A * 11/2019
(Continued)

OTHER PUBLICATIONS

Machine Translation of the Abstract of WO 2011122895A2; published Oct. 6, 2011; 1 page.
(Continued)

*Primary Examiner* — Courtney D Heinle
*Assistant Examiner* — Ryan C Clark
(74) *Attorney, Agent, or Firm* — Thrive IP

(57) ABSTRACT

A continuous fluid flow power generator includes an electrical generator with submersible turbine blades in communication with a flow of fluid in a body of water to generate electricity. The generator may include a water tower and a hydro turbine generator to generate electricity through kinetic actions; a float and piston assembly activated by wave action to deliver water to the water tower; kick turbines to create water flow to the water tower through submersible pumps; and a rechargeable battery in communication with the electrical generator and the hydro turbine generator. The generator may also include solar assemblies and windmills to provide supplemental electricity generation for charging the rechargeable battery. The generator may be connectable to a battery bank aboard a vessel or to an electrical grid.

18 Claims, 14 Drawing Sheets

(52) U.S. Cl.
CPC ... *F05B 2220/703* (2020.08); *F05B 2220/708* (2013.01); *F05B 2260/422* (2020.08); *F05B 2260/63* (2013.01)

(58) Field of Classification Search
CPC ........ F03B 13/12; F03B 13/264; F03B 15/06; F03B 17/06; F03B 17/062; F03B 17/065; F03B 17/061
See application file for complete search history.

(56) References Cited

U.S. PATENT DOCUMENTS

| | | | |
|---|---|---|---|
| 4,383,797 A | 5/1983 | Lee | |
| 8,763,386 B2 | 7/2014 | Greene | |
| 10,774,806 B1 | 9/2020 | Lu | |
| 12,006,918 B2 | 6/2024 | Cummings | |
| 12,025,090 B2 | 7/2024 | Cummings | |
| 2004/0103670 A1 | 6/2004 | Ryan | |
| 2005/0001432 A1 | 1/2005 | Susman et al. | |
| 2005/0134050 A1 | 6/2005 | Salls, Jr. | |
| 2005/0285407 A1 | 12/2005 | Davis et al. | |
| 2006/0054074 A1 | 3/2006 | Wingett et al. | |
| 2008/0014089 A1 | 1/2008 | Janssen | |
| 2010/0237626 A1 | 9/2010 | Hamner | |
| 2010/0244450 A1 | 9/2010 | Tabe | |
| 2010/0258449 A1* | 10/2010 | Fielder | F03B 17/061 204/278 |
| 2011/0089695 A1 | 4/2011 | Krouse et al. | |
| 2012/0019004 A1 | 1/2012 | Ekern | |
| 2012/0183400 A1 | 7/2012 | Onodera | |
| 2012/0200156 A1* | 8/2012 | Weller | F03B 13/26 290/53 |
| 2012/0211987 A1 | 8/2012 | Roe et al. | |
| 2013/0334823 A1 | 12/2013 | Hopper | |
| 2014/0219800 A1 | 8/2014 | Lee | |
| 2014/0333071 A1 | 11/2014 | Wang | |
| 2015/0091303 A1 | 4/2015 | Lee | |
| 2016/0237979 A1 | 8/2016 | Clements | |
| 2017/0138333 A1 | 5/2017 | Toran | |
| 2017/0159645 A1 | 6/2017 | Qin | |
| 2017/0226985 A1* | 8/2017 | Santos | F03B 17/067 |
| 2018/0030958 A1* | 2/2018 | Sant | F03D 9/28 |
| 2018/0087484 A1* | 3/2018 | Schurtenberger | F03B 3/126 |
| 2018/0238294 A1 | 8/2018 | Alm | |
| 2018/0245564 A1* | 8/2018 | Sheldon-Coulson | H02K 7/075 |
| 2018/0258906 A1 | 9/2018 | Mcclary | |
| 2019/0048846 A1 | 2/2019 | Hochstein et al. | |
| 2019/0128241 A1 | 5/2019 | Achard | |
| 2019/0285053 A1 | 9/2019 | Lu | |
| 2020/0010155 A1* | 1/2020 | Robinson | F03D 9/008 |
| 2020/0300218 A1 | 9/2020 | Curutchet | |
| 2024/0183330 A1 | 6/2024 | Cummings | |

FOREIGN PATENT DOCUMENTS

| | | |
|---|---|---|
| DE | 102014111836 B4 | 6/2016 |
| DE | 202019001821 U1 | 5/2019 |
| DE | 202019001000 U1 | 6/2019 |
| DE | 102018100230 A1 | 7/2019 |
| DE | 202019001820 U1 | 8/2019 |
| DE | 202019003419 U1 | 9/2019 |
| DE | 202019004691 U1 | 11/2019 |
| DE | 202019004516 U1 | 12/2019 |
| DE | 202019003156 U1 | 2/2020 |
| EP | 0265594 A | 5/1988 |
| FR | 2955363 A3 | 7/2022 |
| GB | 2184171 A1 | 6/1987 |
| GB | 2416193 A * | 1/2006 ............. F03B 17/06 |
| GB | 2435908 A1 | 9/2007 |
| WO | 2009131459 A2 | 10/2009 |
| WO | 2011122895 A2 | 10/2011 |
| WO | 2020/219010 A | 10/2020 |
| WO | 2020219010 A1 | 10/2020 |
| WO | 2021112993 A1 | 6/2021 |

OTHER PUBLICATIONS

European Search Report issued in related EU Application No. 20897599.5; report issued Apr. 19, 2024; 32 pages.
F. Chen, "Appendix A: Catalog of Global Underwater Turbines" The Kuroshio Power Plant, Lecture Notes in Energy 15, DOI 10.1007/978-3-319-00822-6; @ Springer International; Publishing Switzerland 2013; 47 pages.
International Search Report and Written Opinion of related application No. PCT/US19/28509; mailed Jul. 24, 2019; 9 pages.
International Search Report and Written Opinion of related application No. PCT/US20/58516; mailed Feb. 26, 2021; 15 pages.
Patents Act 1977: Search Report under Section 17 related to Application No. GB0604625.4, Patent No. GB 2435908; date of search Jan. 22, 2007; 1 page.
Screen Shot of GKinetic website "Our Story"; @ 2021 GKinetic; https://gkinetic.com/our-story/; 2 pages.
Examination Report of related Indian Application No. 202117047500; issued Mar. 31, 2022; 6 pages.
Partial Search Result and Provisional Opinion on Patentability of related European Application No. 19925588.6; issued Mar. 31, 2022; 11 pages.
Machine Translation of "Wave energy pumped storage power generation system"; Application No. CN 107044378; published Aug. 15, 2017; 4 pages.
Extended European Search Report of related European Application No. 19925588.6; Issued Feb. 21, 2023; 11 pages.
Machine Translation of the abstract of CN 107044378; Published Aug. 15, 2017; Application is referenced in the Extended European Search Report ; 1 page.
Office Action issued in parent U.S. Appl. No. 17/602,912; Notification date: Sep. 11, 2023; 6 pages.
Office Action issued in parent U.S. Appl. No. 17/602,912; Notification date: Nov. 21, 2023; 15 pages.
Supplementary Partial European Search Report; Issued in related European Application No. 20897599.5; Issue Date: Dec. 1, 2023; 13 pages.
Machine translation of FR 2955363; Published Jul. 22, 2022; 1 page.
Office Action issued in parent U.S. Appl. No. 17/774,436; notification date May 31, 2023; 7 pages.
Office Action issued in parent U.S. Appl. No. 17/774,436; notification date Oct. 4, 2023; 13 pages.
An identification of an earlier application pursuant to 37 CFR 1.98 (d) (1) is attached listing: U.S. Pat. No. 12,006,918 and PCT/US19/028509 (Published as WO 2020/219010; Published: Oct. 29, 2020); 1 page.

* cited by examiner

FIG. 11
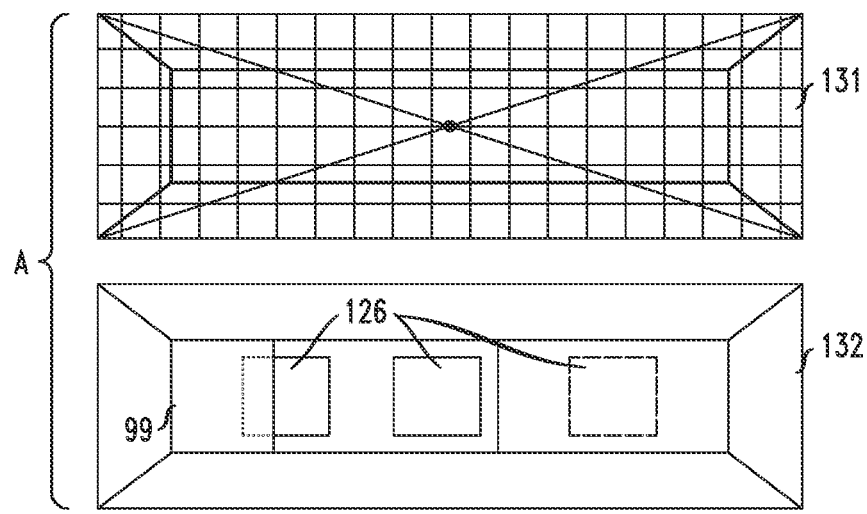
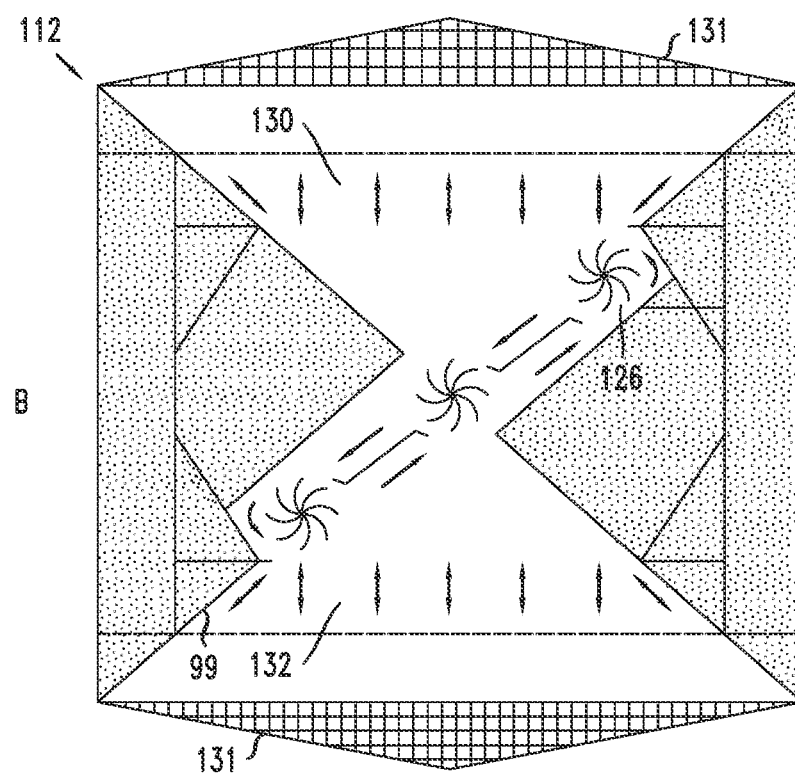

CONTINUOUS FLUID FLOW POWER GENERATOR

CROSS-REFERENCE TO RELATED APPLICATIONS

This patent application is a divisional of and claims priority to U.S. Utility patent application Ser. No. 17/602,912 filed in the United States Patent and Trademark Office ("USPTO") on Oct. 11, 2021, which is a national stage application of and claims priority to Patent Cooperation Treaty Application Number PCT/US19/28509 filed in the USPTO on Apr. 22, 2019, all of which are incorporated herein by reference thereto in their entireties.

BACKGROUND OF THE DISCLOSURE

Alternative energy generation is sought by many people, businesses, and countries for reasons ranging from political to ideological to hoped-for cost reductions. However, known alternative energy sources such as solar and wind—standing alone—have substantial drawbacks.

On a cost per watt basis, generating electricity based on solar energy is expensive compared to conventional hydrocarbon fuels, wind, hydro, coal, and nuclear power. A single solar cell using the most advanced semiconductor materials generates relatively little electricity. Therefore, solar panels with extremely large surface areas are required to capture sufficient sunlight to generate satisfactory electricity. Still further, expensive battery storage banks are needed to offset inevitable cloudy days when the solar panels are dormant.

Windmills are another popular source of alternative energy, but like solar, this method of electricity generation requires expensive capital investment and is subject to the weather—if no wind is blowing, no energy is being generated. Also, like solar, harnessing wind for electricity generation requires large windmill farms to be practical relative to the expensive capital equipment and installation costs. Even a few adamant supporters will have to admit that finding the large areas needed to harness these energy sources is fraught with controversy; for instance, acres of land are required for numerous, massive windmills.

What is needed in the field of alternative energy production are systems and methods that continuously produce electricity regardless of weather conditions and which can be positioned inconspicuously or isolated from view.

BRIEF SUMMARY OF THE DISCLOSURE

The present disclosure is directed in general to devices and systems for using docks, boats, and open water to generate electricity for homes and businesses. Advantageously, the systems are not in public view and operate around the clock to generate electricity.

The systems also can be employed under bridges or at the sides of main water channels where strong, steady current flows are located. Diffusion doors, according to one aspect of the disclosure, will enhance current flow and torque to generate electricity for counties or cities.

Multiple units may be connected together in a sock or snake-like arrangement and/or installed beside each other in the open ocean current streams at a charging station. Freight liners can be equipped with large, safe, environmentally friendly batteries capable of handling high electrical currents. One ship and its bank of batteries can draw power from the generators of the systems at the charging stations and return and transfer the stored electricity in its batteries to land while another ship is charging its battery bank. Moreover, the ships would not need conventional engines as they could be powered by the batteries on board.

In a further aspect, smaller generator units can be used with smaller boats such as pontoon boats. The smaller generators can be installed on the deck of the boat. When the boat arrives in a desired location with strong water current flowing, the boat can be anchored, and the generator turbine unit lowered into the water to generate electricity which can be stored in a battery installed on the boat. When the battery is charged, the turbine blade can be retrieved, for instance, to a position on the deck of the pontoon boat and locked to a safe position with a coupling and pin. Once back on land, the battery load can be safely transferred to a unit installed at a house or transferred to an electrical distribution grid.

An exemplary continuous fluid flow power generator according to the disclosure includes a power generator having submersible turbine blades in communication with a flow of fluid in a body of water; a water tower having a water pipe disposed proximate the generator; a submersible pump in communication with the turbine blades, the submersible pump in communication with the water pipe to fill the water tower as the turbine blades are rotated by the flow of fluid, the turbine blades further causing the power generator to generate a first source of electricity; a hydro turbine generator connected to the water pipe; and a pumping assembly having a water conduit in communication with the water tower, the pumping assembly being activated by wave action to deliver water to the water tower; and a rechargeable battery in communication with the power generator and the hydro turbine generator; wherein, when the water tower reaches a desired level, the water is released to activate the hydro turbine generator to generate a second source of electricity, the first and second sources of electricity being storable in a rechargeable battery or in communication with an electrical grid.

According to this aspect of the disclosure, the flow of fluid is water current, and the turbine blades are configured to rotate as the water current passes along the blades. Moreover, the pumping assembly may include a float and a conduit in which the float is movably disposed about the conduit to pump water through the conduit into the water tower. The pumping assembly may further include a piston assembly that pumps water into the water tower as the float moves. Multiple floats and piston pumps may be provided to pump water into the water tower.

Also according to this aspect of the disclosure, the continuous fluid flow power generator may include a kick turbine disposed proximate the submersible turbine blades, the kick turbine in communication with a secondary flow of water being emitted from the submersible turbine blades to activate the kick turbine to deliver additional water to the water tower.

The continuous fluid flow power generator of this aspect may further include a windmill in communication with the rechargeable battery or the electrical grid in which the windmill is configured to turn with wind currents to generate electricity to charge the rechargeable battery or deliver electricity to the electrical grid.

Still further, the continuous fluid flow power generator in this aspect may include solar panels in communication with the rechargeable battery or the electrical grid in which the solar panels are configured to capture sunlight to generate electricity to charge the rechargeable battery or deliver electricity to the electrical grid.

In another embodiment of the disclosure, a continuous fluid flow power generator may include a power generator having a plurality of submersible turbine blades in communication with a flow of fluid in a body of water; diffusing doors disposed proximate the turbine blades, the diffusing doors configured to direct the flow of fluid to the turbine blades to generate electricity; and a rechargeable battery in communication with the power generator, the electricity being storable in the rechargeable battery. In this example, the submersible turbine blades may be arranged near or connected directly to a fixed or floating structure. In a further aspect, some of the submersible turbine blades can be arranged under a water vessel, and a screen can be placed near the submersible turbine blades to prevent foreign objects from reaching the turbine blades.

In a further embodiment of the disclosure, a method for generating power from a continuous fluid flow may include providing a power generator having a plurality of submersible turbine blades in communication with a flow of fluid in a body of water; arranging a water tower having a water pipe proximate the power generator; providing a submersible pump in communication with the turbine blades, the submersible pump in communication with the water pipe; rotating the turbine blades by the flow of fluid to cause the submersible pump to fill the water tower, the turbine blades further causing the power generator to generate a first source of electricity; providing a hydro turbine generator connected to the water pipe; and arranging a float and piston assembly having a water conduit in communication with the water tower; activating the float and piston assembly by wave action to deliver water to the water tower; providing an electrical receptacle in communication with the power generator and the hydro turbine generator; releasing the water from the water tower when full to activate the hydro turbine generator to generate a second source of electricity; and delivering the first and second sources of electricity being to the electrical receptacle. In this exemplary embodiment, the electrical receptacle may be a rechargeable battery or land-based electrical grid.

The method may further include providing a wind mill to generate electricity using wind in which the windmill is in communication with the electrical receptacle to deliver the electricity thereto. Still further, the method may include providing solar panels to capture sunlight to generate electricity in which the solar panels are in communication with the electrical receptacle to deliver the electricity thereto. The electrical receptacle may be a rechargeable battery, and the method may further include retrieving the rechargeable battery and replacing with a battery to be charged.

In another embodiment according to the present disclosure, a continuous fluid flow power generator includes a power generator having a plurality of submersible turbine blades in communication with a flow of fluid in a body of water wherein the turbine blades are rotated by the flow of fluid to generate electricity; a floating or stationary platform for supporting the power generator; a tower disposed proximate the floating platform, the platform connected thereto, the tower having a docking area; and a vessel equipped with a battery bank, the vessel dockable with the docking area, the battery bank being electrically connectable to the power generator to charge the battery bank. The continuous fluid flow power generator may also include screens located near the submersible turbine blades to prevent foreign objects from reaching the turbine blades.

Other embodiments include the foregoing and other elements and steps described herein, and their equivalents, in various combinations.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which refers to the appended figures, in which:

FIG. 11 shows in part A an exploded elevational view of a turbine intake assembly as in FIG. 10 with portions of an intake in phantom for clarity, and in part B a plan view of the turbine intake assembly taken along lines XI-XI in FIG. 10 with flotation walls in phantom;

DETAILED DESCRIPTION OF THE DISCLOSURE

Figure 1:
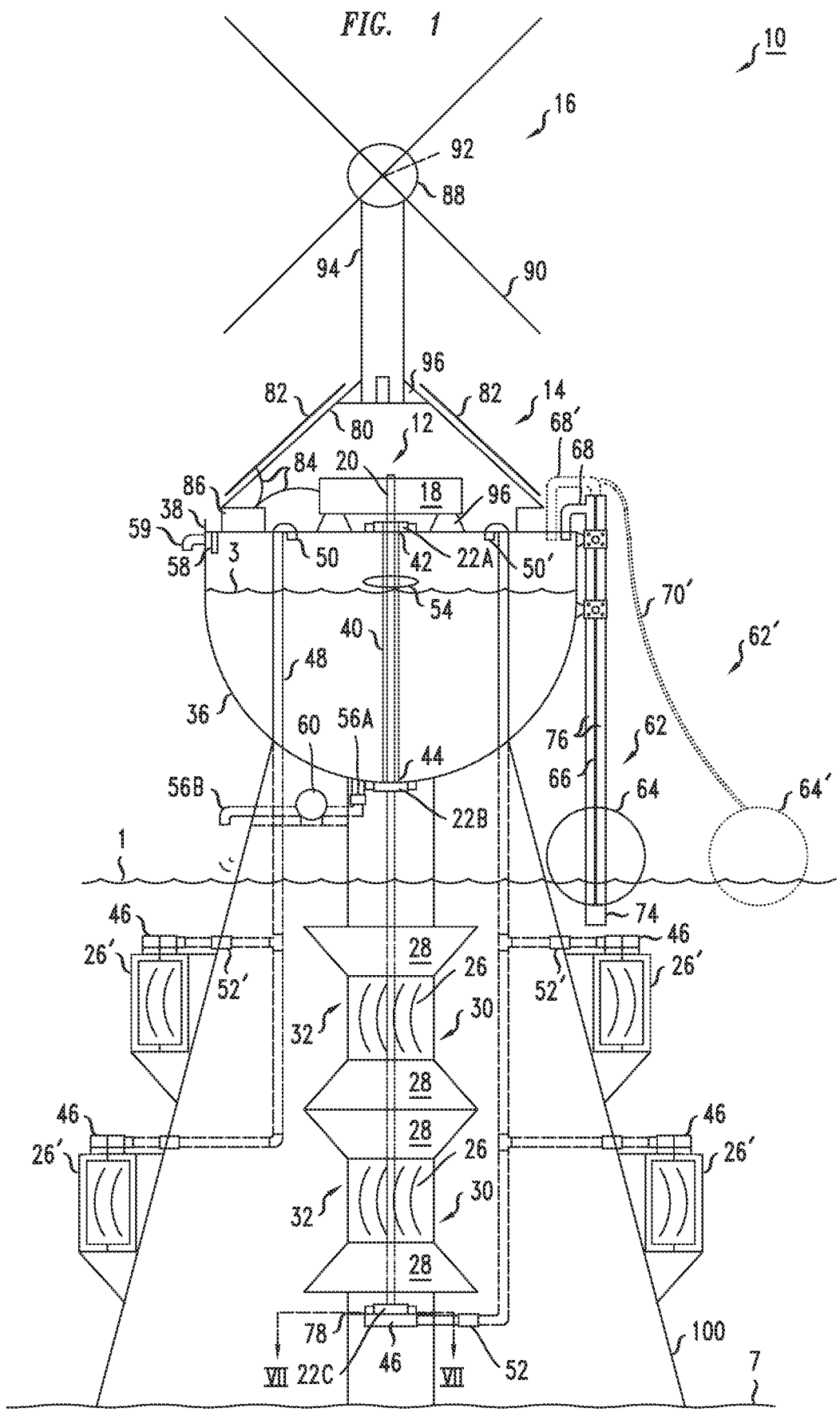
FIG. 1 is an elevational, schematic view of a system for continuous electricity production according to an aspect of the disclosure, including representative parts shown in cross section, phantom, and/or truncated for clarity.

As required, detailed embodiments are disclosed herein; however, it is to be understood that the disclosed embodiments are merely exemplary and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical and scientific terms used herein have the same meaning as is commonly understood by one of ordinary skill in the art to which this disclosure belongs. In the event that there is a plurality of definitions for a term or acronym herein, those in this section prevail unless stated otherwise.

Wherever the phrase "for example," "such as," "including" and the like are used herein, the phrase "and without limitation" is understood to follow unless explicitly stated otherwise. Similarly, "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etcetera. Thus, for example, "a device having components a, b, and c" means that the device includes at least components a, b, and c. Similarly, the phrase: "a method involving steps a, b, and c" means that the method includes at least steps a, b, and c.

Where a list of alternative component terms is used, e.g., "a structure such as 'a,' 'b,' 'c,' 'd' or the like," or "a" or b," such lists and alternative terms provide meaning and context unless indicated otherwise.

Unless the context clearly requires otherwise, throughout the description and the claims, the words "comprise," "comprising," and the like are to be construed in an inclusive sense as opposed to an exclusive or exhaustive sense; in the sense of "including, but not limited to."

Any discussion of prior art in the specification should in no way be considered as an admission that such prior art is widely known or forms part of common general knowledge in the field.

The various embodiments of the disclosure and/or equivalents falling within the scope of present disclosure overcome or ameliorate at least one of the disadvantages of the prior art or provide a useful alternative.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Turning now to FIG. 1, a continuous fluid flow power generator according to an aspect of the disclosure is designated in general by the element number 10. The power or electricity generator 10 is installed on an exemplary tapered foundation or base 100 anchored at a bottom 7 of the ocean or other open water 1 to take advantage of continuous current flows and wave action. The power generator 10 broadly includes a Turbine Generator Assembly 12, a Solar Power Assembly 14, and a Windmill Assembly 16. The exemplary Turbine Generator Assembly 12 includes a generator 18, a turbine shaft 20, a first or top end bearing 22A, a second or mid bearing 22B, and a third or bottom end bearing 22C. Those skilled in the art will understand that the Turbine Generator Assembly 12 is not limited to the exemplary bearings shown in this example and that fewer or additional bearings may be utilized to accommodate different sizes, weights, and lengths of shafts. Here also, a central turbine or turbine blades 26 are shown between diffusing doors 28 having respective intakes or openings 30, 32 to receive a flow of water 1 to turn the turbine blades 26 to generate electricity, as will be explained in greater detail below.

As particularly shown in FIGS. 1 and 2, positioned below the bearing 22C in this example is a pump brace or flooring 78 to anchor or hold the bearing 22C and a submersible pump 46. Here, the submersible pump 46, which has a water intake valve (not shown) and is in communication with a check valve 52 located in a water pipe 48 to fill a water container 36. The check valve 52 prevents the water that is already in the pipe 48 from flowing back toward the pump 46 so that the pump 46 does not have to pump against gravity. Although only one submersible pump 46 is shown in this example, multiple submersible pumps may be provided, such as in a stacked arrangement to increase water pumping capacity.

Figure 2:
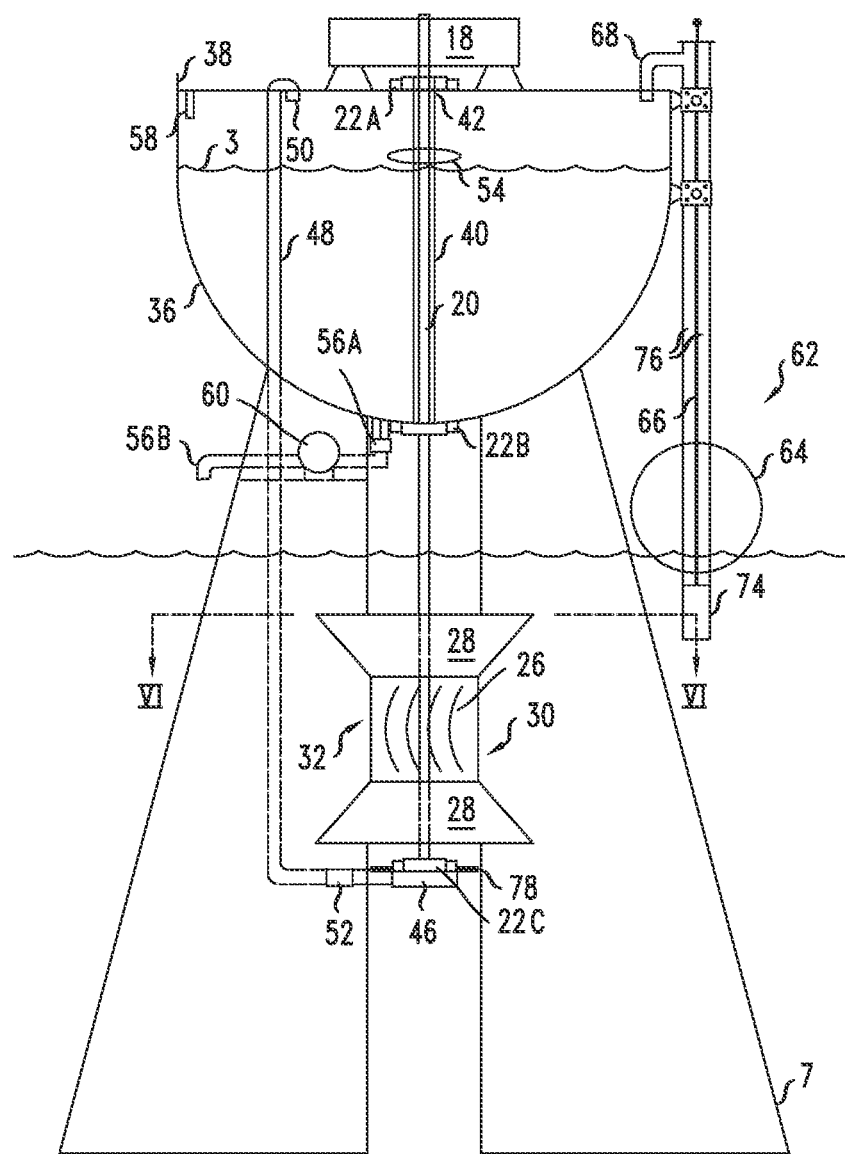
FIG. 2 is an elevation view of a portion of the system as in FIG. 1.

As further shown in FIGS. 1 and 2, the water pipe 48 terminates at an outlet or nozzle 50 to fill the water container 36 with water 3. A safety fence 38 may be provided to prevent debris or personnel from falling into the open water 1. As the water level 3 rises or recedes, it respectively lifts or lowers a buoy or float device 54 that travels up and down a pipe or conduit 40, which surrounds the turbine shaft 20. As further shown the pipe 40 has a first or top end 42 near the top bearing 22A and another end 44 near the bearing 22B. When the float 54 rises to a predetermined or preset height near the top end 42, the float 54 trips or opens a dumping valve 56A that releases the water 3 from a nozzle or aperture 56B into the open water 1. Here also, a secondary water sensing device or safety valve 58 is provided to open the dumping valve 56A and release the water 3. As the water 3 is released into the ocean 1 it activates a hydro turbine generator 60 to contribute to energy generation by the system 10, as explained further herein. An "empty sensor" (not shown) may also be provided to close or shut the dumping valve 56A in the event that the tank 36 is empty to prevent potential damage to the hydro turbine generator 60.

Conversely, an overflow nozzle 59 may also be provided in the event the water 3 reaches an overfill condition in the tank 36 for any reason.

FIG. 1 further shows additional sets of turbine blades 26', also known herein as a "kick turbines," that may be provided to generate still more electricity resulting from an accelerated water stream flowing from the central turbine blades 26 described above. Here, the kick turbines 26' are shown schematically but can be mechanically connected to or near the base 100 and tied into one or more water pipes 48 to help fill the water container 36 with water 3. At least one kick turbine 26' may be provided level with the openings 30, 32, and multiple additional kick turbines 26' can be arranged sequentially as shown to further fill the container 36. Moreover, provided sufficient depth of the ocean 1, additional diffusing doors and turbine assemblies may be positioned below and in line with the blades 26 and diffusing doors 28. Each of these additional assemblies may have accompanying kick turbines 26' arranged at the level of their respective turbine assemblies 26 to achieve maximum water flow across the blades of the kick turbines 26'. Respective submersible pumps 46' also may be provided in communication with the kick turbines 26' to fill the water container 36 as described above with respect to turbine 26 and pump 46.

Figure 3:
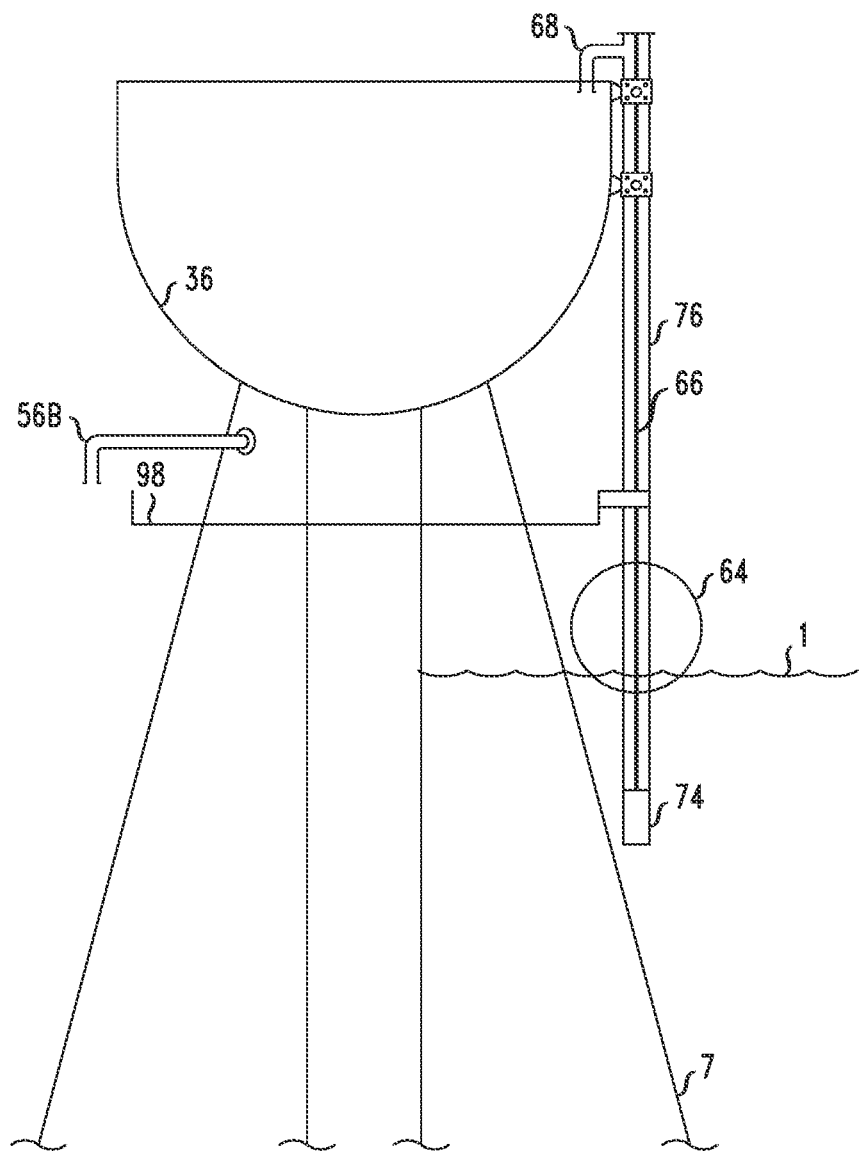
FIG. 3 is a partial elevational view of the portion of the system as in FIG. 2.

With reference now to FIGS. 1, 2 and 3, a pumping or float and piston assembly 62 is in communication with the water container 36 in this example via a water pipe 66. A walkway or platform 98, as particularly shown in FIG. 3, may be provided to which the pumping assembly 62 may be attached for additional structural support and maintenance access. Additionally, the exemplary platform 98 may be an enclosed room to shield equipment.

As shown in FIGS. 1, 2 and 3, a beach-ball-shaped float 64 (although other shapes may be used) is slidably attached around pumping rods 76 that in turn surround the pipe 66. As the float 64 moves up and down due to wave action of the ocean 1, it draws water into a piston pump 74 that delivers water into the container 36 via a nozzle or valve 68, which contributes to the action of the float 54 and activation of the hydro turbine generator 60 described above. For clarity, only one float and piston assembly 62 is shown in FIGS. 1, 2 and 3. However, multiple float and piston assemblies may be used described with respect to FIG. 5 below.

FIG. 1 also particularly shows another pumping assembly or pump and float assembly 62'. Here, a float 64' may be attached via a piston pump handle 70' to deliver water 3 via a nozzle 68' (shown in phantom for clarity). As the float 64' moves up and down due to wave action of the ocean 1, it draws water into the piston pump 74 that delivers water into the container 36 via the nozzle 68', which contributes to the action of the float 54 and activation of the hydro turbine generator 60 described above. The pumping assemblies 62, 62' may be utilized in the alternative, or they may be interspersed around the water container 36 as described below.

Figure 5:
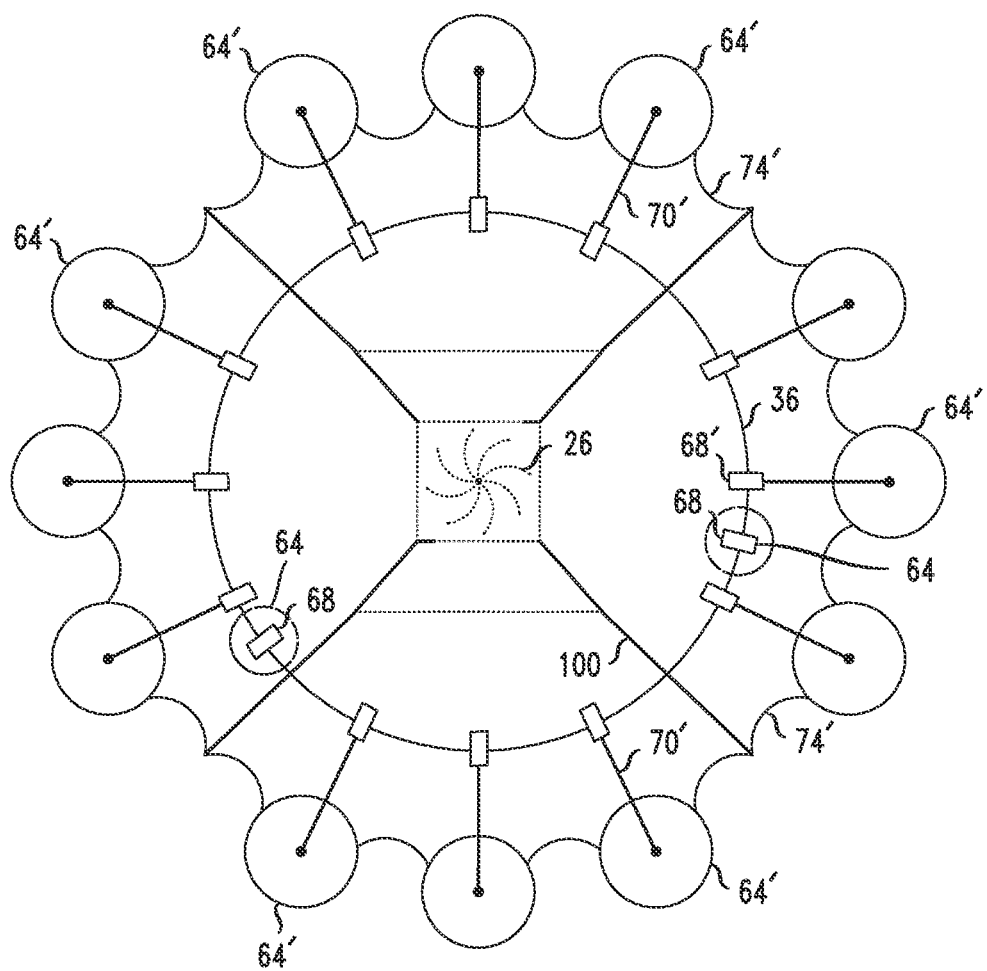
FIG. 5 is a top plan view of portions of the system in FIG. 1.

With reference to FIG. 5, the multiple floats 64, 64' introduced above are shown distributed around the water container 36. For clarity, only two exemplary straight-arm floats 64 are shown by way of example, but as noted above, these floats 64 may be interspersed between each set of pump-arm floats 64'. Also shown in FIG. 5, chains or cables 74' may be used to link the floats 64' to each other while each float 64' is also connected to its respective pumping arm 70' as explained above. Also shown schematically in this top plan view are the turbine blades 26 centered between the tapered base 100.

Figure 4:
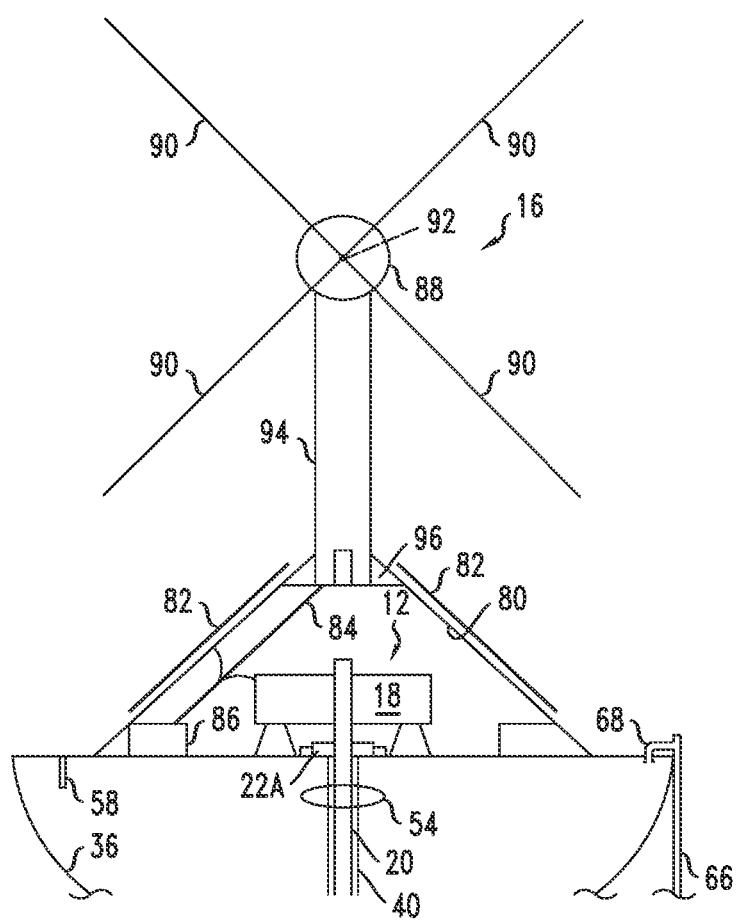
FIG. 4 is an elevational view of another portion of the system as in FIG. 1.

Turning now to the Solar Power Assembly 14 introduced above, as shown most clearly in FIG. 4 a hip roof 80 may be provided to cover the generator 18. As shown, the roof 80 may be overlaid with solar panels 82. Therefore, while the turbine generator assembly 12 as explained above is constantly generating electricity via water and current action, the solar panels 82 also may be contributing to power generation and electricity storage in a battery 86, which is in electrical communication with the solar panels 82. Electrical cables or connections 84 are shown schematically connected between the panels 82 and the battery 86. However, if the Solar Power Assembly 14 is located in proximity to land, the solar-generated electricity can be transmitted directly to a power or electrical grid rather than stored in the battery 86.

By way of example and not of limitation, an Ambri-brand liquid metal battery may be employed as the battery 86. Ambri-brand batteries are advertised as being non-explosive and are not prone to overheating or catching fire and are relatively cost effective and reliable. Further, these batteries are advertised as responding to grid signals in milliseconds and will discharge slowly. Because Ambri-brand batteries are emission free, there is no need for a controlled temperature environment as these batteries are capable of high electrical currents at over 2000 degrees Fahrenheit. Ambri-brand batteries are fully sealed and are manufactured from earth abundant elements (magnesium, molten salt, and antimony). A shipping container size battery will put out 2 MWH and supply power to approximately 200 homes for one week.

With further reference to FIGS. 1, 2, and 4, the windmill 16 briefly introduced above includes a power generator 88, which, like the solar panel assembly 14, is electrically connected to the battery 86 (or electrical grid) via electrical lines 84. In this example, the windmill 16 includes three or more exemplary blades 90 that are connected to a shaft 92, which extends from the power generator 88. The windmill 16 and its blades 90 are erected on and supported by a shaft 94 that is connected to a base or brace 96 that may be installed on the hip roof 80 described above. As the turbine generator assembly 12 and the solar panel assembly 14 are respectively generating electricity via water and current action and sunlight, the windmill 16 also may be contributing to power generation and electricity storage in the battery 86 (or feeding the electrical grid) as the wind blows, particularly on the open ocean 1.

Figure 6:
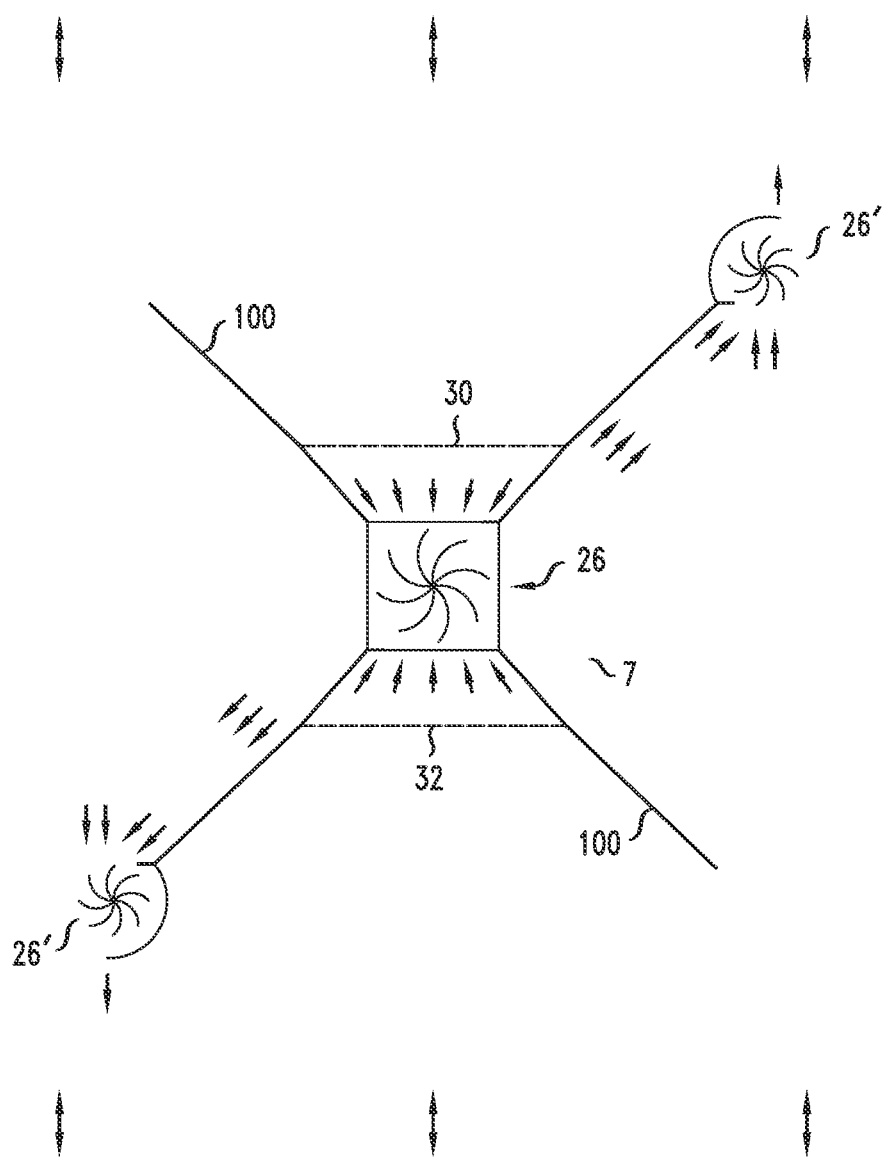
FIG. 6 is a partial cross section view of a base of the system take along lines VI-VI in FIG. 2.

With more particular reference to the flat, tapered walls 100 and turbine blades 26 introduced in FIGS. 1, 2, and 5, the walls 100 shown in FIG. 6 can be installed by way of example on the ocean floor 7. Here, the exemplary arrangement channels a flow of current (schematically indicated by double-headed arrows entering or leaving at 30, 32) into the rotary turbine blades 26 from either direction as tidal flows change. FIG. 6 shows that the turbine blades 26 will spin in the same direction regardless of which direction the tide or current is moving; i.e., high tide water current is shown flowing in toward the blades 26 from the top of the figure through diffusing door 30. Likewise, low tide current flows in from the bottom of the figure through diffusing doors 32 to force the turbine blades 26 to turn in the same direction, which in turn generates electricity to be stored in the battery 86 (or delivered to an electrical grid) as described above.

Figure 7:
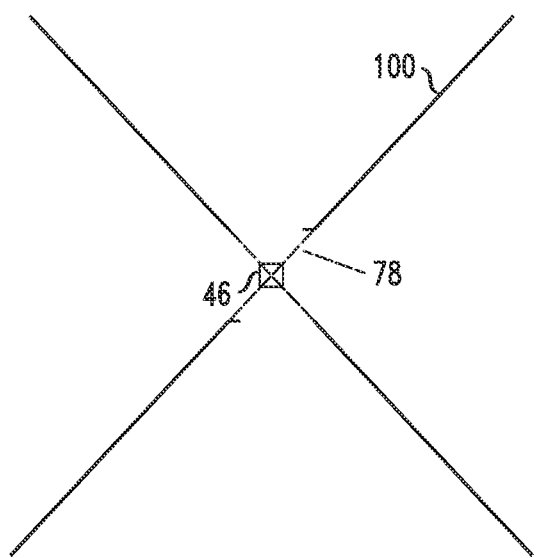
FIG. 7 is a partial cross section view of a brace aspect of the system taken along lines VII-VII in FIG. 1.
Figure 8:
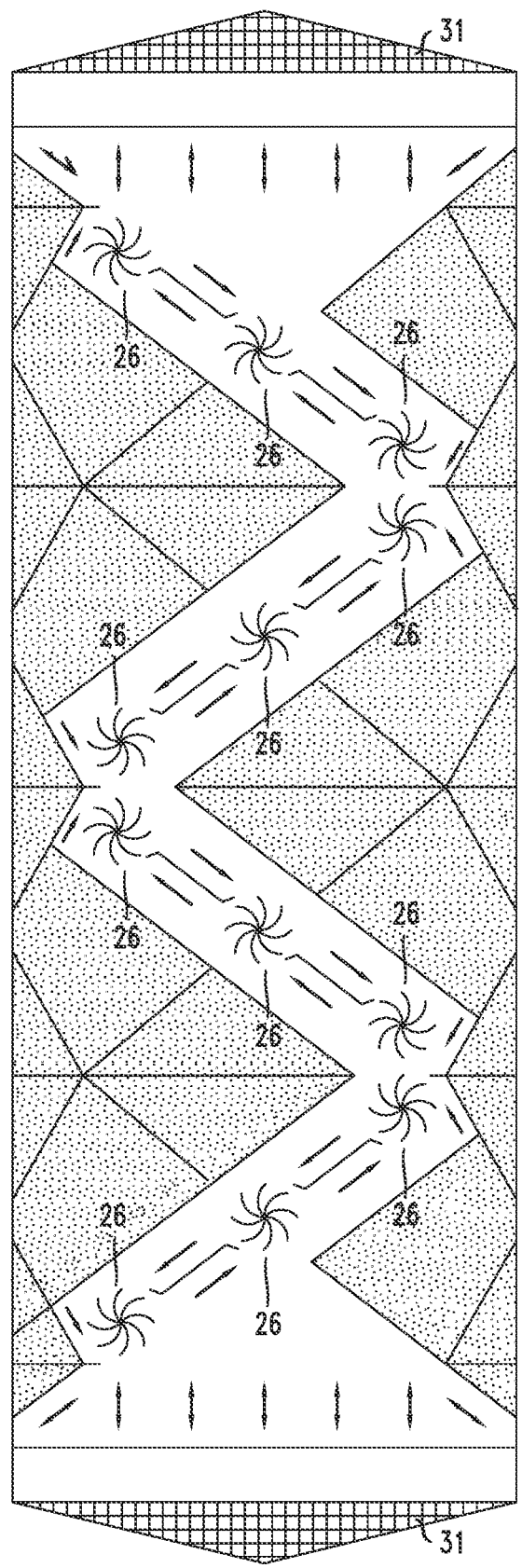
FIG. 8 is a schematic plan view of various turbine units as in FIG. 1, particularly showing units connecting in series with alternating units spinning clockwise and counterclockwise.

FIG. 7 also shows the tapered walls 100 but in this partial cross section the pump brace 78 can be most clearly seen to which the submersible pump 46 introduced above is attached. This arrangement, as described above, prevents the turbine shaft 20 from spinning out of position or applying unwanted torque to other components; e.g., to prevent the submersible pump 46 from spinning Turning to FIG. 8, an exemplary arrangement of four turbine units, each having three turbine blade sets, are arranged in series in which the turbine blades 26 of top unit spins clockwise and the next one spins counterclockwise and so on. Both ends may have screens 31 and are both inlets and outlets depending upon current or tidal flow (schematically indicated by double-headed arrows). These units can be of one size or of various sizes, and multiple units can be arranged for any desired length. Further, the units may be connected side to side for any desired width. Still further, kick walls (see, e.g., walls 99 in FIG. 11) are provided to ensure that water flows into the various blades in only one direction.

Figure 9:
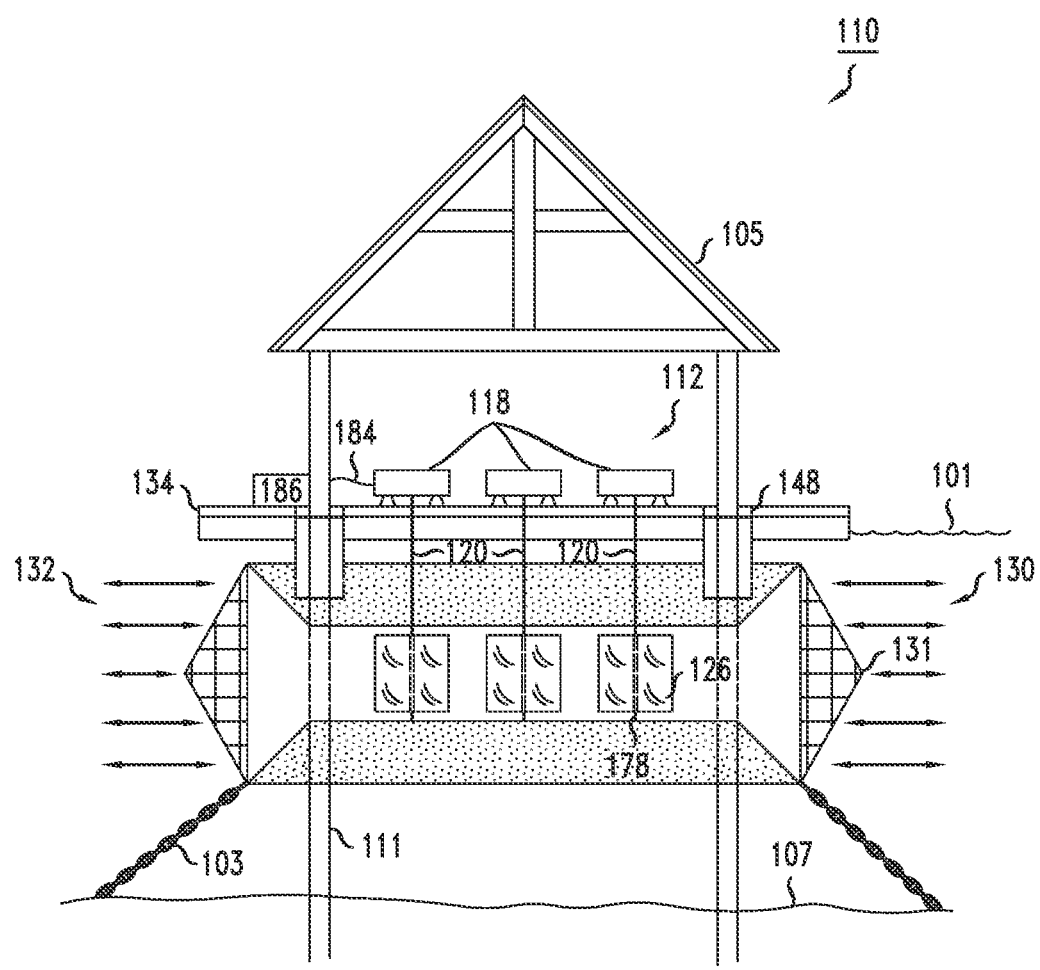
FIG. 9 is a partially cutaway, side, elevational view of another embodiment according to the disclosure in which a system for generating electricity via fluid flow is arranged on a structure.

With reference now to FIG. 9, a power generation system according to another embodiment is broadly indicated by reference number 110. Here, a generator assembly 112 is attached to, near, or under a fixed or floating structure such as a spillway, a dam, a bridge, dock or the like, generally designated as 134. The dock 134 in this example is anchored by poles or pilings 111 to a river or lakebed 107 and may be further secured by chains or cables 103, particularly in bodies of water with strong currents or those susceptible to harsh weather conditions. As shown, the assembly 112 includes one or more sealed generators 118 positioned on the dock 134 above a water line 101. The generators 118 preferably are shielded by a roof or protective cover 105. The generators 118 each have turbine shafts 120 connected to respective turbine blades 126 (shown schematically) for generating electricity from the underwater current to charge a battery 186 (or electrical grid). Each of the shafts 120 are secured by braces 178 to prevent other components from twisting or turning as the shafts 120 rotate, as explained in more detail with respect to FIG. 12 below.

As further shown in FIG. 9, fittings or sleeves 148, which are preferably stainless steel, are connected around the pilings 111. The generator unit 112 along with the dock 134 therefore floats up and down the pilings 111 as the tide rises or recedes or waves move them. Also shown are screens 131 to allow only water to enter and to prevent debris, large fish, and even people from reaching the turbine blades 126 entering from either diffusion door 130, 132.

Figure 10:
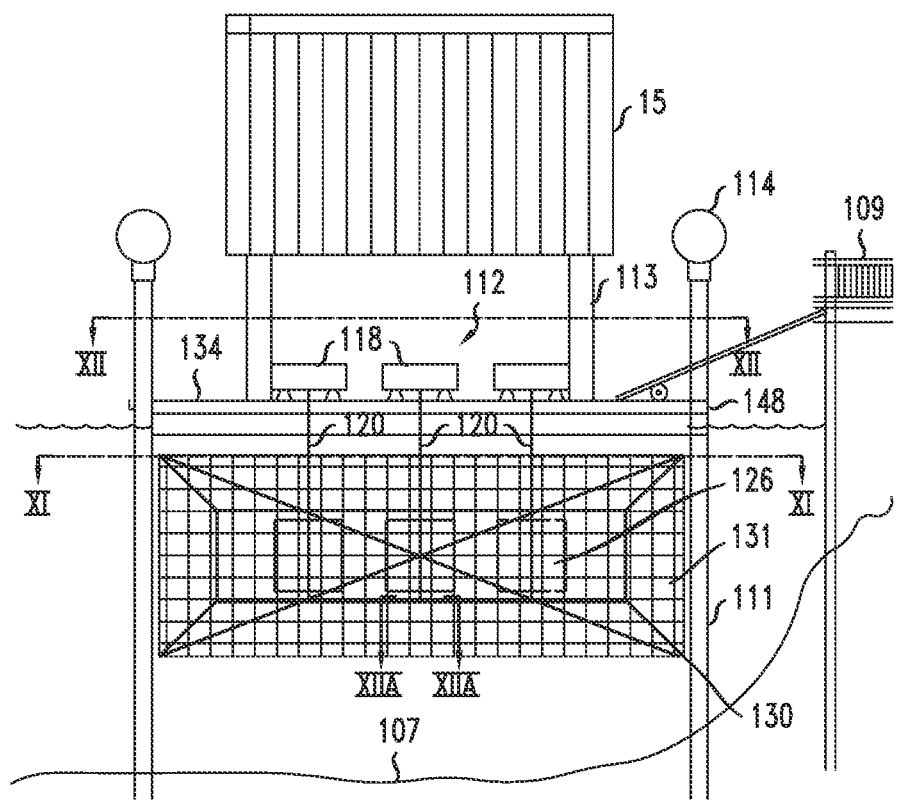
FIG. 10 is a partially cutaway, front, elevational view of the embodiment as in FIG. 9.

With respect to both FIGS. 9 and 10, the tapered diffusing door 130 directs and concentrates water flow toward the blades 126 while one of the screens 131 protects the turbine blades 126 as indicated above. Also shown in FIG. 10 are solar lights 114 that can be charged during the daytime to provide light to those on the dock 134 or nearby walkways 109 at night.

FIG. 11 shows in part A the screen 131 separated from the diffusing door 132 introduced in FIG. 9. Some of the turbines 126 may be viewed in FIG. 11, which are partly obscured by kick walls 99. More particularly, as shown in part B of FIG. 11 a single generator 112 is shown from the top in which the screens 131 protect the diffusing doors 130, 132 and thereby the turbine blades 126 as the water flows in or out through either door 130, 132 as the tide or current shifts. The kick walls 99 (which also contain floatation material indicated here in partial cross section) ensure that water entering either door 130, 132 contacts the blades 126 in only one direction so the water current is not striking the foremost blades 126 in opposing directions, which would reduce turbine effectiveness. Moreover, by directing or focusing the incoming current onto the blades 126, the kick walls 99 have the additional benefit of concentrating the current and accelerating a rotation of the turbine blades 126 thereby increasing energy production.

Figure 12:
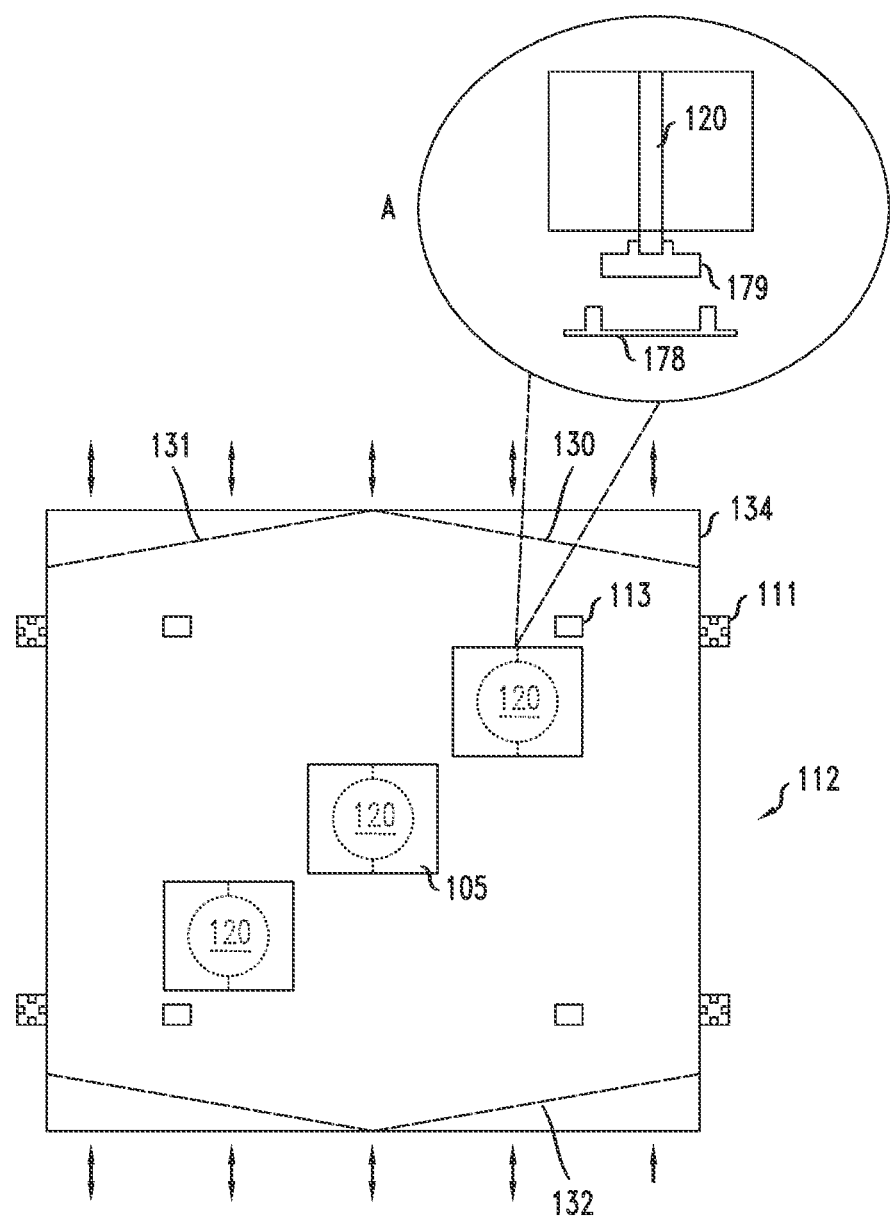
FIG. 12 shows a plan view of the turbine intake assembly taken along lines XII-XII in FIG. 10, and shows in an inset a cross sectional, elevational view of a bearing anchor assembly taken along lines XIIA-XIIA in FIG. 10.

Turning to FIG. 12, another view of the generator system 112 as in FIG. 11 shows three generators 120 (in phantom for clarity) arranged between roof posts 113. Pilings 111 are shown around a perimeter of the dock 134 with diffusing screens 131 shown in phantom to screen water flow (indicated by double-headed arrows) at entrances 130, 132. Here, the generators 120 are protected by doors or hatches 105 wherein people may walk on the dock 134 (and over the hatches 105) without interfering with the generators 120. As shown in the inset, if one of the generators 120 needs service or replacement, the respective hatch 105 can be opened and the generator 120 may be lifted easily from the hatch 105 and replaced. Specifically, a bearing sleeve 179 may be provided, which is anchored in the brace 178 to keep the shaft 120 from rotating uncontrollably or causing other components to twist. However, as the inset illustrates, the sleeve 179 along with the shaft 120 can be removed or installed axially without little effort.

Figure 13:
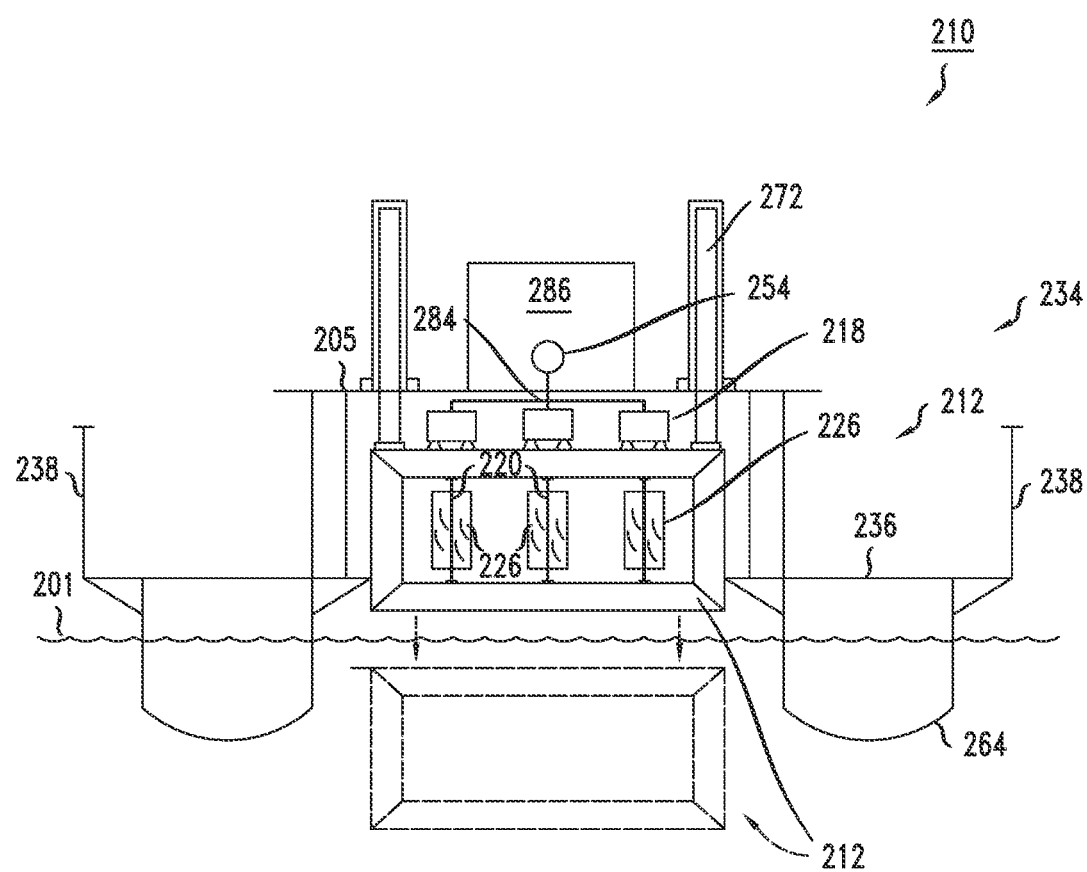
FIG. 13 is a partially cutaway, front, elevational view of another embodiment according to the disclosure in which a system for generating electricity via fluid flow is arranged on a vessel.

With reference now to FIG. 13, a power generation system according to another embodiment is broadly indicated by reference number 210. Here, a generator assembly 212 is attached to or under a platform such as a boat, vessel, barge, or the like generally designated as 234. Alternatively, the platform can be a stationary, anchored, or fixed structure. In this example, the vessel 234 has guard rails 238 and pontoons 264 for floating on a river or lake 201. As shown, the assembly 212 includes one or more sealed generators 218 positioned on a deck 236. The generators 218 preferably are shielded by a roof or protective cover 205 and are in electrical communication with a rechargeable battery 286. The generators 218 each have turbines 220 connected to respective turbine blades 226 (shown schematically) to generate power to charge the battery 286. Also shown is a retractable electrical cable harness 254 that can be used with hydraulic piston assemblies 272 to lower the turbines 220 into the water at an area where current is flowing to spin the turbine blades 226 to thereby charge the battery 286 via electrical cables 284. The deployed or submersed turbines 220 are shown schematically and in phantom for clarity. When the battery 286 is charged, the electrical cables 284 can be reeled in with the cable harness 254, and the turbines 220 retracted to the deck vessel 234.

Figure 14:
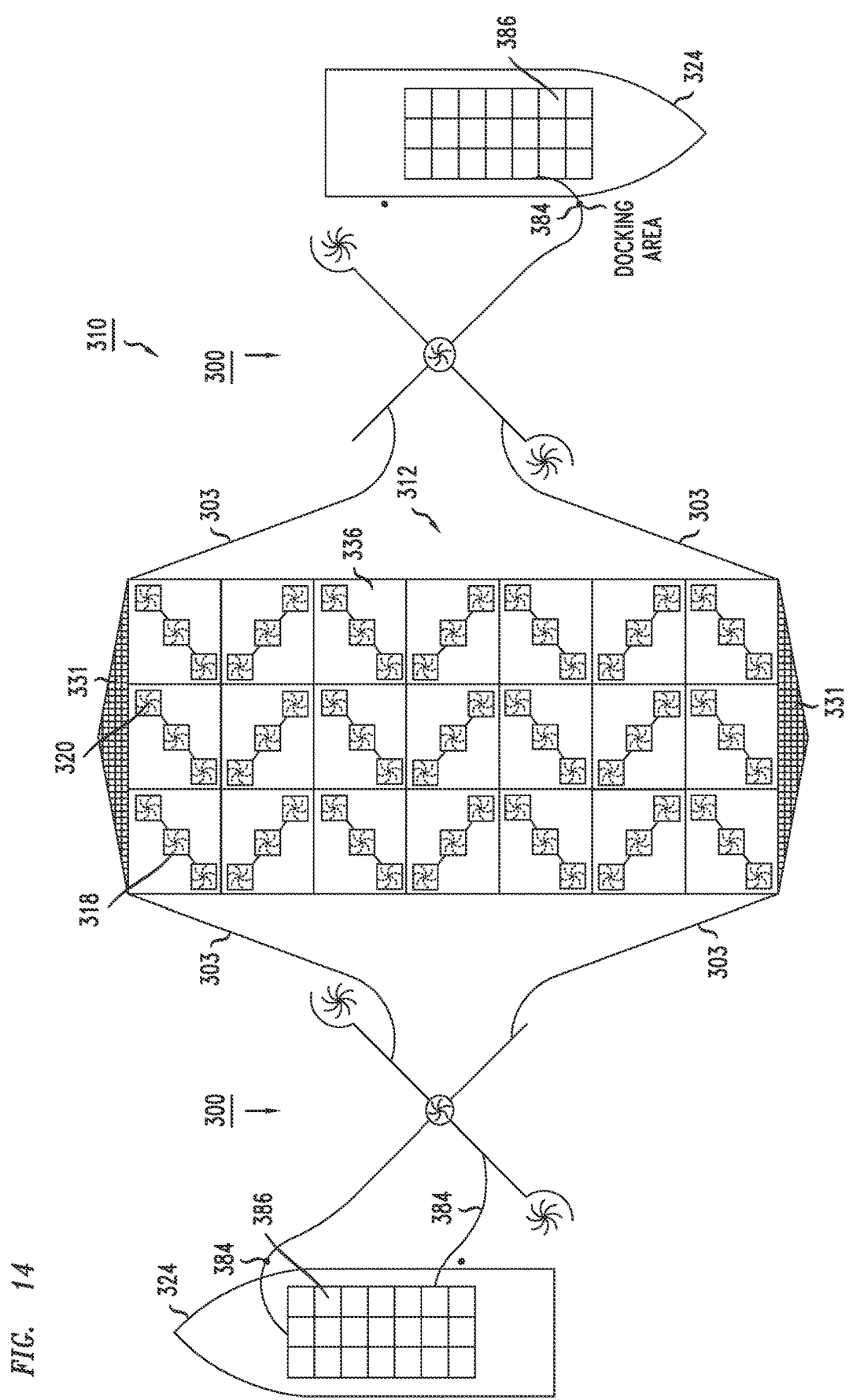
FIG. 14 is a schematic, plan view of another embodiment according to the disclosure in which a system for generating electricity via fluid flow is shown in an intended open water environment in which vessels may clock to charge battery banks.

FIG. 14 shows a power generation system according to another embodiment of the disclosure, which is broadly indicated by reference number 310. Here, a floating generator platform 312 includes a bank of generators 318 positioned on a deck 336. The generators 318 preferably are shielded by a roof or protective cover (not shown) and are in electrical communication with turbines 320 to generate power to recharge battery banks 386 aboard vessels 324 docked to respective collocated platforms or towers 300. As shown, cables, chains, or harnesses 303 can be used to attach the floating platform 312 to the towers 300, and the battery banks 386 aboard the vessels 324 may be charged by the generators 318 via electrical cables or connections 384. There will be sufficient but restricted slack in the harnesses 303 to accommodate wave and tidal actions but to prevent the platform 312 from contacting the towers 300 or the anchored vessels 324. Moreover, the vessels 324 will be anchored or docked at sufficient distances so as to not disturb the generators 318 or other pumping devices. When the battery bank 386 aboard one of the vessels 324 is charged, that vessel 324 may depart to deliver its charge to land, such as to an electrical grid, while the other vessel 324 recharges its battery bank 386. Of course, if the platform 312 is sufficiently close to land, the electrical cables 384 may be connected directly to an electrical grid to provide power to nearby municipalities.

EXEMPLARY EMBODIMENTS

Embodiment 1. A continuous fluid flow power generator, comprising a power generator having a plurality of submersible turbine blades in communication with a flow of fluid in a body of water; a water tower having a water pipe disposed proximate the generator; a submersible pump in communication with the turbine blades, the submersible pump in communication with the water pipe to fill the water tower as the turbine blades are rotated by the flow of fluid, the turbine blades further causing the power generator to generate a first source of electricity; a hydro turbine generator connected to the water pipe; and a pumping assembly having a water conduit in communication with the water tower, the pumping assembly being activated by wave action to deliver water to the water tower; and a rechargeable battery in communication with the power generator and the hydro turbine generator; wherein, when the water tower reaches a desired level, the water is released to activate the hydro turbine generator to generate a second source of electricity, the first and second sources of electricity being storable in a rechargeable battery or in communication with an electrical grid.

Embodiment 2. The continuous fluid flow power generator of embodiment 1, wherein the flow of fluid is water current, and the turbine blades are configured to rotate as the water current passes along the blades.

Embodiment 3. The continuous fluid flow power generator of embodiments 1 or 2, wherein the pumping assembly includes a float and a conduit, the float movably disposed about the conduit to pump water through the conduit into the water tower.

Embodiment 4. The continuous fluid flow power generator of any of the embodiments 1-3, wherein the pumping assembly includes a piston assembly that pumps water into the water tower.

Embodiment 5. The continuous fluid flow power generator of any of the embodiments 1-4, wherein the pumping assembly includes a plurality of floats and a plurality of piston pumps to pump water into the water tower.

Embodiment 6. The continuous fluid flow power generator of any of the embodiments 1-5, further comprising a kick turbine disposed proximate the submersible turbine blades, the kick turbine in communication with a secondary flow of water being emitted from the submersible turbine blades to activate the kick turbine to deliver additional water to the water tower.

Embodiment 7. The continuous fluid flow power generator of any of the preceding embodiments, further comprising a windmill in communication with the rechargeable battery or the electrical grid, the windmill being configured to turn with wind currents to generate electricity to charge the rechargeable battery or deliver electricity to the electrical grid.

Embodiment 8. The continuous fluid flow power generator of any of the preceding embodiments, further comprising solar panels in communication with the rechargeable battery or the electrical grid, the solar panels being configured to capture sunlight to generate electricity to charge the rechargeable battery or deliver electricity to the electrical grid.

Embodiment 9. A continuous fluid flow power generator, comprising a power generator having a plurality of submersible turbine blades in communication with a flow of fluid in a body of water; diffusing doors disposed proximate the turbine blades, the diffusing doors configured to direct the flow of fluid to the turbine blades to generate electricity; and a rechargeable battery in communication with the power generator, the electricity being storable in the rechargeable battery.

Embodiment 10. The continuous fluid flow power generator of embodiment 9, wherein the submersible turbine blades are arranged proximate a fixed or floating structure.

Embodiment 11. The continuous fluid flow power generator as in embodiments 9 or 10, wherein the submersible turbine blades are arranged under a water vessel.

Embodiment 12. The continuous fluid flow power generator as in any one of embodiments 9 through 11, further comprising a screen disposed proximate the submersible turbine blades to prevent foreign objects from reaching the turbine blades.

Embodiment 13. A method for generating power from a continuous fluid flow, the method comprising providing a power generator having a plurality of submersible turbine blades in communication with a flow of fluid in a body of water; arranging a water tower having a water pipe proximate the power generator; providing a submersible pump in communication with the turbine blades, the submersible pump in communication with the water pipe; rotating the turbine blades by the flow of fluid to cause the submersible pump to fill the water tower, the turbine blades further causing the power generator to generate a first source of electricity; providing a hydro turbine generator connected to the water pipe; and arranging a float and piston assembly having a water conduit in communication with the water tower; activating the float and piston assembly by wave action to deliver water to the water tower; providing an electrical receptacle in communication with the power generator and the hydro turbine generator; releasing the water from the water tower when full to activate the hydro turbine generator to generate a second source of electricity; and delivering the first and second sources of electricity being to the electrical receptacle.

Embodiment 14. The method as in embodiment 13, wherein the electrical receptacle is a rechargeable battery or land-based electrical grid.

Embodiment 15. The method as in embodiments 13 or 14, further comprising providing a wind mill to generate electricity using wind, the windmill being in communication with the electrical receptacle to deliver the electricity thereto.

Embodiment 16. The method as in embodiments 13 through 15, further comprising providing solar panels to capture sunlight to generate electricity, the solar panels being in communication with the electrical receptacle to deliver the electricity thereto.

Embodiment 17. The method as in embodiments 13 through 16, wherein the electrical receptacle is a rechargeable battery and further comprising retrieving the rechargeable battery and replacing with a battery to be charged.

Embodiment 18. A continuous fluid flow power generator, comprising a power generator having a plurality of submersible turbine blades in communication with a flow of fluid in a body of water wherein the turbine blades are rotated by the flow of fluid to generate electricity; a floating platform for supporting the power generator; a tower disposed proximate the floating platform, the floating platform connected thereto, the tower having a docking area; and a vessel equipped with a battery bank, the vessel dockable with the docking area, the battery bank being electrically connectable to the power generator to charge the battery bank.

Embodiment 19. The continuous fluid flow power generator as in embodiment 18, wherein the platform is a stationary platform or a floating platform.

Embodiment 20. The continuous fluid flow power generator as in embodiments 18 or 19, further comprising respective screens disposed proximate the submersible turbine blades to prevent foreign objects from reaching the turbine blades.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A continuous fluid flow power generator, comprising:
    a power generator having a plurality of submersible turbine blades in communication with a flow of fluid in a body of water wherein the turbine blades are rotated by the flow of fluid to generate a first source of electricity;
    a kick turbine disposed proximate to at least one of the plurality of submersible turbine blades, wherein the kick turbine is in communication with a secondary flow of water emitted from the at least one of the plurality of submersible turbine blades to activate the kick turbine;
    a platform for supporting the power generator;
    a tower disposed proximate the platform, and connected thereto, the tower having a docking area; and
    a vessel equipped with a battery bank, the vessel dockable with the docking area, the battery bank in electrical communication with the power generator to charge the battery bank.

2. The continuous fluid flow power generator as in claim 1, wherein the flow of fluid in the body of water is water current.

3. The continuous fluid flow power generator as in claim 1, wherein the vessel is one of a boat or a barge.

4. The continuous fluid flow power generator as in claim 1, wherein the platform is one of a stationary platform or a floating platform.

5. The continuous fluid flow power generator as in claim 4, further comprising a harness, the harness being configured to attach the platform to the tower, and wherein the harness is responsive to wave and tidal actions while simultaneously configured to prevent the platform from contacting the tower and the vessel.

6. The continuous fluid flow power generator as in claim 1, further comprising a retractable, electrical cable harness and a hydraulic piston assembly configured to lower the submersible turbine blades into the body of water at one of a desired depth or a location.

7. The continuous fluid flow power generator as in claim 1, wherein the vessel is configured to store electrical energy onboard via the battery bank, to discharge electrical energy to a second vessel, to discharge electrical energy to a land-based electrical grid, and combinations thereof.

8. The continuous fluid flow power generator as in claim 1, further comprising diffusing doors disposed proximate to at least one of the submersible turbine blades.

9. The continuous fluid flow power generator as in claim 1, further comprising respective screens disposed proximate the submersible turbine blades to prevent foreign objects from reaching the submersible turbine blades.

10. The continuous fluid flow power generator as in claim 1, wherein the kick turbine is in communication with the secondary flow of water emitted from the submersible turbine blades to activate the kick turbine to deliver additional water to the tower.

11. The continuous fluid flow power generator as in claim 1, further comprising a plurality of kick turbines.

12. The continuous fluid flow power generator as in claim 1, wherein a protective covering is disposed proximate the power generator.

13. The continuous fluid flow power generator as in claim 12, further comprising a plurality of solar panels affixed to the protective covering, wherein the solar panels are in electrical communication with the battery bank or the electrical grid and configured to absorb sunlight to generate a second source of electrical energy.

14. The continuous fluid flow power generator as in claim 1, further comprising a windmill in electrical communication with the battery bank or the electrical grid, the windmill being configured to rotate with wind currents to generate a third source of electrical energy.

15. The continuous fluid flow power generator as in claim 1, further comprising a turbine shaft, a plurality of braces, and a submersible turbine, the turbine shaft being connected to the power generator and to the submersible turbine, the braces supporting the turbine shaft to prevent movement of the power generator during operation.

16. The continuous fluid flow power generator as in claim 1, wherein the power generator operates continuously to generate electrical energy.

17. The continuous fluid flow power generator as in claim 1, wherein the power generator is a plurality of power generators oriented horizontally within the body of water.

18. The continuous fluid flow power generator as in claim 1, wherein the power generator is a plurality of power generators oriented vertically within the body of water.

* * * * *